(12) United States Patent
Lowry et al.

(10) Patent No.: US 7,685,030 B1
(45) Date of Patent: Mar. 23, 2010

(54) SPARSE DELTA MODEL FOR POSITION AND BALANCE INFORMATION

(75) Inventors: Andrew R. Lowry, Ardsley, NY (US); Eric Suss, Metuchen, NJ (US); John P. Gaine, Mt. Kisco, NY (US)

(73) Assignee: Morgan Stanley, New York, NY (US)

( * ) Notice: Subject to any disclaimer, the term of this patent is extended or adjusted under 35 U.S.C. 154(b) by 1685 days.

(21) Appl. No.: 10/618,247

(22) Filed: Jul. 11, 2003

(51) Int. Cl.
*G07B 17/00* (2006.01)
*G07F 19/00* (2006.01)
*G06Q 40/00* (2006.01)

(52) U.S. Cl. .................................. 705/30; 705/37
(58) Field of Classification Search ................ 705/4, 705/14, 35, 36 R, 37, 42, 1, 27, 10; 707/1, 707/4, 10; 713/172
See application file for complete search history.

(56) References Cited

U.S. PATENT DOCUMENTS

| 5,978,779 | A | 11/1999 | Stein et al. | |
|---|---|---|---|---|
| 6,408,282 | B1 | 6/2002 | Buist | |
| 6,513,019 | B2 * | 1/2003 | Lewis | 705/35 |
| 2002/0032640 | A1 * | 3/2002 | LaFore et al. | 705/37 |
| 2002/0042764 | A1 | 4/2002 | Gardner et al. | |
| 2002/0065752 | A1 | 5/2002 | Lewis | |
| 2002/0111891 | A1 * | 8/2002 | Hoffman et al. | 705/36 |
| 2002/0156722 | A1 * | 10/2002 | Greenwood | 705/37 |

OTHER PUBLICATIONS

Jonathan Weil, What Enron's Financial Reports Did—and Didn't—Reveal—Auditor Could Face Scrutiny on Clarity of Financial Reports, Nov. 5, 2001, Wall Street Journal, Eastern Edition: ABI/Inform Global, Proquest. Web. Nov. 24, 2009.*

* cited by examiner

*Primary Examiner*—Matthew S Gart
*Assistant Examiner*—Mohammad R Ullah Masud
(74) *Attorney, Agent, or Firm*—K&L Gates LLP

(57) ABSTRACT

Systems and techniques for operating on data representing an account include posting an activity record representing account activity. The systems and techniques may involve setting an activity date for an activity having an accounting impact, determining a balance value, setting an accounting impact date, and setting a journal activity date. The balance value may correspond to the net sum of activity for the activity date. The accounting impact date may correspond to the latest accounting impact date among all journals affecting the balance value. The journal activity date may correspond to the latest accounting impact date among all journals affecting the sum of activity for prior processing dates applied on the date. In some cases, the activity record may be posted to a specific period.

17 Claims, 13 Drawing Sheets

─ 40

Initial State:

| Date | PBValue | Adjustment | Comp-Adj | AID | Adj AID | JAD | Gap Flag |
|---|---|---|---|---|---|---|---|
| 01/01/0001 | 100 | 0 | 0 | 09/10/02 | 01/01/0001 | 09/10/02 | 1 |
| 09/12/02 | 0 | 0 | 0 | 01/01/0001 | 01/01/0001 | 01/01/0001 | 0 |

400 — (row 1)
401 — (row 2)

After J1:

| Date | PBValue | Adjustment | Comp-Adj | AID | Adj AID | JAD | Gap Flag |
|---|---|---|---|---|---|---|---|
| 03/18/02 | 10 | 0 | 0 | 03/18/02 | 01/01/0001 | 03/18/02 | 0 |

After J2:

| Date | PBValue | Adjustment | Comp-Adj | AID | Adj AID | JAD | Gap Flag |
|---|---|---|---|---|---|---|---|
| 03/18/02 | 30 | 0 | 0 | 03/18/02 | 01/01/0001 | 03/18/02 | 0 |

After J3:

| Date | PBValue | Adjustment | Comp-Adj | AID | Adj AID | JAD | Gap Flag |
|---|---|---|---|---|---|---|---|
| 03/18/02 | 30 | 0 | 0 | 03/18/02 | 01/01/0001 | 03/18/02 | 0 |
| 03/25/02 | 5 | 0 | 0 | 03/25/02 | 01/01/0001 | 03/18/02 | 0 |

500 — (row 1)
501 — (row 2)

After J4:

| Date | PBValue | Adjustment | Comp-Adj | AID | Adj AID | JAD | Gap Flag |
|---|---|---|---|---|---|---|---|
| 03/15/02 | 0 | 10 | 0 | 01/01/0001 | 03/20/02 | 01/01/0001 | 0 |
| 03/18/02 | 30 | 0 | 0 | 03/18/02 | 01/01/0001 | 03/18/02 | 0 |
| 03/20/02 | 10 | 0 | -10 | 03/20/02 | 01/01/0001 | 03/20/02 | 0 |
| 03/25/02 | 5 | 0 | 0 | 03/25/02 | 01/01/0001 | 03/18/02 | 0 |

After J5:

| Date | PBValue | Adjustment | Comp-Adj | AID | Adj AID | JAD | Gap Flag |
|---|---|---|---|---|---|---|---|
| 03/15/02 | 0 | 10 | 0 | 01/01/0001 | 03/20/02 | 01/01/0001 | 0 |
| 03/18/02 | 30 | -5 | 0 | 03/18/02 | 03/20/02 | 03/18/02 | 0 |
| 03/20/02 | 5 | 0 | -5 | 03/20/02 | 01/01/0001 | 03/20/02 | 0 |
| 03/25/02 | 5 | 0 | 0 | 03/25/02 | 01/01/0001 | 03/18/02 | 0 |

After J8:

| Date | PBValue | Adjustment | Comp-Adj | AID | Adj AID | JAD | Gap Flag |
|---|---|---|---|---|---|---|---|
| 03/15/02 | 0 | 10 | 0 | 01/01/0001 | 03/20/02 | 01/01/0001 | 0 |
| 03/18/02 | 30 | -5 | 0 | 03/18/02 | 03/20/02 | 03/18/02 | 0 |
| 03/20/02 | 5 | 0 | -5 | 03/20/02 | 01/01/0001 | 03/20/02 | 0 |
| 03/22/02 | 10 | 0 | 0 | 03/22/02 | 01/01/0001 | 03/22/02 | 0 |
| 03/25/02 | 5 | -5 | 0 | 03/25/02 | 04/02/02 | 03/18/02 | 0 |
| 04/02/02 | -5 | 0 | 5 | 04/02/02 | 01/01/0001 | 04/02/02 | 0 |
| 04/25/02 | 10 | 0 | 0 | 04/25/02 | 01/01/0001 | 04/25/02 | 0 |

After A9:

| | Date | PBValue | Adjustment | Comp-Adj | AID | Adj AID | JAD | Gap Flag |
|---|---|---|---|---|---|---|---|---|
| 507 | 03/15/02 | 0 | 10 | 0 | 01/01/0001 | 03/20/02 | 01/01/0001 | 1 |
| 508 | 03/16/02 | 0 | 0 | 0 | 01/01/0001 | 01/01/0001 | 01/01/0001 | 0 |
| 500 | 03/18/02 | 30 | -5 | 0 | 03/18/02 | 03/20/02 | 03/18/02 | 0 |
| 503 | 03/20/02 | 5 | 0 | -5 | 03/20/02 | 01/01/0001 | 03/20/02 | 0 |
| 504 | 03/22/02 | 10 | 0 | 0 | 03/22/02 | 01/01/0001 | 03/22/02 | 0 |
| 501 | 03/25/02 | 5 | -5 | 0 | 03/25/02 | 04/02/02 | 03/18/02 | 0 |
| 505 | 04/02/02 | -5 | 0 | 5 | 04/02/02 | 01/01/0001 | 04/02/02 | 0 |
| 506 | 04/25/02 | 10 | 0 | 0 | 04/25/02 | 01/01/0001 | 04/25/02 | 0 |

After A10:

| | Date | PBValue | Adjustment | Comp-Adj | AID | Adj AID | JAD | Gap Flag |
|---|---|---|---|---|---|---|---|---|
| 507 | 03/15/02 | 0 | 10 | 0 | 01/01/0001 | 03/20/02 | 01/01/0001 | 1 |
| 509 | 03/17/02 | 0 | 0 | 0 | 01/01/0001 | 01/01/0001 | 01/01/0001 | 0 |
| 500 | 03/18/02 | 30 | -5 | 0 | 03/18/02 | 03/20/02 | 03/18/02 | 0 |
| 503 | 03/20/02 | 5 | 0 | -5 | 03/20/02 | 01/01/0001 | 03/20/02 | 0 |
| 504 | 03/22/02 | 10 | 0 | 0 | 03/22/02 | 01/01/0001 | 03/22/02 | 0 |
| 501 | 03/25/02 | 5 | -5 | 0 | 03/25/02 | 04/02/02 | 03/18/02 | 0 |
| 505 | 04/02/02 | -5 | 0 | 5 | 04/02/02 | 01/01/0001 | 04/02/02 | 0 |
| 506 | 04/25/02 | 10 | 0 | 0 | 04/25/02 | 01/01/0001 | 04/25/02 | 0 |

After A11:

| | Date | PBValue | Adjustment | Comp-Adj | AID | Adj AID | JAD | Gap Flag |
|---|---|---|---|---|---|---|---|---|
| 507 | 03/15/02 | 0 | 10 | 0 | 01/01/0001 | 03/20/02 | 01/01/0001 | 1 |
| 500 | 03/18/02 | 30 | -5 | 0 | 03/18/02 | 03/20/02 | 03/18/02 | 0 |
| 503 | 03/20/02 | 5 | 0 | -5 | 03/20/02 | 01/01/0001 | 03/20/02 | 0 |
| 504 | 03/22/02 | 10 | 0 | 0 | 03/22/02 | 01/01/0001 | 03/22/02 | 0 |
| 501 | 03/25/02 | 5 | -5 | 0 | 03/25/02 | 04/02/02 | 03/18/02 | 0 |
| 505 | 04/02/02 | -5 | 0 | 5 | 04/02/02 | 01/01/0001 | 04/02/02 | 0 |
| 506 | 04/25/02 | 10 | 0 | 0 | 04/25/02 | 01/01/0001 | 04/25/02 | 0 |

After A12:

| | Date | PBValue | Adjustment | Comp-Adj | AID | Adj AID | JAD | Gap Flag |
|---|---|---|---|---|---|---|---|---|
| 507 | 03/15/02 | 30 | 5 | 0 | 03/18/02 | 03/20/02 | 03/18/02 | 1 |
| 510 | 03/19/02 | 0 | 0 | 0 | 01/01/0001 | 01/01/0001 | 01/01/0001 | 0 |
| 503 | 03/20/02 | 5 | 0 | -5 | 03/20/02 | 01/01/0001 | 03/20/02 | 0 |
| 504 | 03/22/02 | 10 | 0 | 0 | 03/22/02 | 01/01/0001 | 03/22/02 | 0 |
| 501 | 03/25/02 | 5 | -5 | 0 | 03/25/02 | 04/02/02 | 03/18/02 | 0 |
| 505 | 04/02/02 | -5 | 0 | 5 | 04/02/02 | 01/01/0001 | 04/02/02 | 0 |
| 506 | 04/25/02 | 10 | 0 | 0 | 04/25/02 | 01/01/0001 | 04/25/02 | 0 |

After A13:

| | Date | PBValue | Adjustment | Comp-Adj | AID | Adj AID | JAD | Gap Flag |
|---|---|---|---|---|---|---|---|---|
| 507 | 03/15/02 | 50 | 0 | -5 | 03/25/02 | 04/02/02 | 03/22/02 | 1 |
| 511 | 03/31/02 | 0 | 0 | 0 | 01/01/0001 | 01/01/0001 | 01/01/0001 | 0 |
| 505 | 04/02/02 | -5 | 0 | 5 | 04/02/02 | 01/01/0001 | 04/02/02 | 0 |
| 506 | 04/25/02 | 10 | 0 | 0 | 04/25/02 | 01/01/0001 | 04/25/02 | 0 |

After A14:

| | Date | PBValue | Adjustment | Comp-Adj | AID | Adj AID | JAD | Gap Flag |
|---|---|---|---|---|---|---|---|---|
| 507 | 03/15/02 | 50 | 0 | -5 | 03/25/02 | 04/02/02 | 03/22/02 | 1 |
| 511 | 03/31/02 | 0 | 0 | 0 | 01/01/0001 | 01/01/0001 | 01/01/0001 | 0 |
| 512 | 04/02/02 | -5 | 0 | 5 | 04/02/02 | 01/01/0001 | 04/02/02 | 1 |
| 513 | 04/03/02 | 0 | 0 | 0 | 01/01/0001 | 01/01/0001 | 01/01/0001 | 0 |
| 506 | 04/25/02 | 10 | 0 | 0 | 04/25/02 | 01/01/0001 | 04/25/02 | 0 |

| After A15: | | | | | | | |
|---|---|---|---|---|---|---|---|
| Date | PBValue | Adjustment | Comp-Adj | AID | Adj AID | JAD | Gap Flag |
| 03/15/02 | 50 | 0 | -5 | 03/25/02 | 04/02/02 | 03/22/02 | 1 |
| 03/31/02 | 0 | 0 | 0 | 01/01/0001 | 01/01/0001 | 01/01/0001 | 0 |
| 04/02/02 | 5 | 0 | 5 | 04/25/02 | 01/01/0001 | 04/25/02 | 1 |
| 04/30/02 | 0 | 0 | 0 | 01/01/0001 | 01/01/0001 | 01/01/0001 | 0 |

| After A16: | | | | | | | |
|---|---|---|---|---|---|---|---|
| Date | PBValue | Adjustment | Comp-Adj | AID | Adj AID | JAD | Gap Flag |
| 03/15/02 | 50 | 0 | -5 | 03/25/02 | 04/02/02 | 03/22/02 | 1 |
| 04/02/02 | 5 | 0 | 5 | 04/25/02 | 01/01/0001 | 04/25/02 | 1 |
| 04/30/02 | 0 | 0 | 0 | 01/01/0001 | 01/01/0001 | 01/01/0001 | 0 |

| After M17: | | | | | | | |
|---|---|---|---|---|---|---|---|
| Date | PBValue | Adjustment | Comp-Adj | AID | Adj AID | JAD | Gap Flag |
| 03/15/02 | 55 | 0 | 0 | 04/25/02 | 04/02/02 | 04/25/02 | 1 |
| 04/30/02 | 0 | 0 | 0 | 01/01/0001 | 01/01/0001 | 01/01/0001 | 0 |

SPARSE DELTA MODEL FOR POSITION AND BALANCE INFORMATION

TECHNICAL FIELD

The present invention relates generally to systems and methods for collecting, analyzing, and reporting data and, more particularly, to systems and methods for organizing and operating on data representing account balances and securities positions.

BACKGROUND

In any business, transactions occur that must be posted to accounts for financial reporting and other purposes. In a brokerage business, a stock record must also be maintained showing positions in stocks and other securities, both in terms of ownership (long) and location (short) of the represented shares. For a variety of accounting purposes, as well as to support ad-hoc queries, the accounting system must be able to provide net balance and position information for a given account.

In many cases, transactions are posted either in advance of or after the date in which they take effect (i.e., forward-dated and back-dated transactions). The accounting system should be able to answer questions of the form "What was the balance/position in account XYZ on date mm/dd/yyyy?" The query can be posed either as an "As-On" query, in which case back-dated transactions posted after mm/dd/yyyy should be ignored, or as an "As-Of" query in which case those back-dated journals should be considered. For a large brokerage operation, the number balances and positions to be tracked can be very large, with a large volume of transactions processed each day.

Current schemes for processing transactions involve inefficient operations and require a vast amount of storage capacity. For instance, data records are maintained for all days of a retention schedule, including those days on which no activity occurs. At the beginning of each new day, all data contained in the data records for the previous day is copied and carried forward into identical data records for the new day. The processing of forward-dated and back-dated transactions involves updating data records for all intervening dates. Performing these operations on a large scale is very costly to a business.

Accordingly, systems and methods for organizing and operating on data representing account balances and securities positions are needed in a way that is capable of scaling and efficiently processes transactions.

SUMMARY

In one general aspect, systems and techniques for operating on data representing an account may include posting an activity record representing account activity. The systems and techniques may involve setting an activity date for an activity having an accounting impact, determining a balance value, setting an accounting impact date, and setting a journal activity date. The balance value may correspond to the net sum of activity for the activity date. The accounting impact date may correspond to the latest accounting impact date among all journals affecting the balance value. The journal activity date may correspond to the processing date among all journals affecting the balance value. In some cases, the activity record may be posted to a specific period.

Implementations may include one or more of the following features. For example, the systems and techniques may involve setting an adjustment value, setting a compensating value, and/or setting an adjustment accounting impact date. The adjustment value may correspond to the sum of activity for the activity date to be applied on subsequent processing dates. The compensating value may correspond to the negative sum of activity for prior processing dates applied on the activity date. The adjustment accounting impact date may correspond to the latest accounting impact date among all journals affecting the adjustment value.

Implementations may include obtaining as-on or as-of values for the account for a given date. The as-on value may be obtained by summing balance values for all dates up to and including the given date. The as-of value may be obtained by summing balance values, adjustment values, and compensating values for all dates up to and including the given date. The latest journal accounting impact date and/or the latest journal activity date may be obtained in connection with the as-on or as-of values. In some cases, the as-on or as-of values may be obtained for a specific period.

Implementations also may include obtaining total adjustments and/or net adjustments for the account for a given date. Total adjustments may be obtained by summing adjustment values for all dates up to and including the given date. Net adjustments may be obtained by summing adjustment values and compensating values for all dates up to and including the given date.

Implementations also may include archiving activity records according to a retention schedule. The retention schedule may include a required number of days, months, and/or years for maintaining activity records. Archiving may involve creating one or more gap records, merging consecutive gap records, and/or creating a new activity record. A gap record may assume the values from one or more activity records. The new activity record may have an activity date immediately following an activity date of the gap record and/or have a balance value of zero.

Aspects of the present invention may be implemented by a computer system and/or by a computer program stored on a computer readable medium. The computer readable medium may comprise a disk, a device, and/or a propagated signal.

Other features and advantages will be apparent from the following description, including the drawings, and from the claims.

DESCRIPTION OF THE FIGURES

FIG. 4 illustrates an initial state table according to one embodiment of the present invention.

FIGS. 5A-5O illustrate point-in-time tables according to one embodiment of the present invention.

FIGS. 7A-7D illustrate graphical user interfaces according to one embodiment of the present invention.

DETAILED DESCRIPTION

Figure 1:
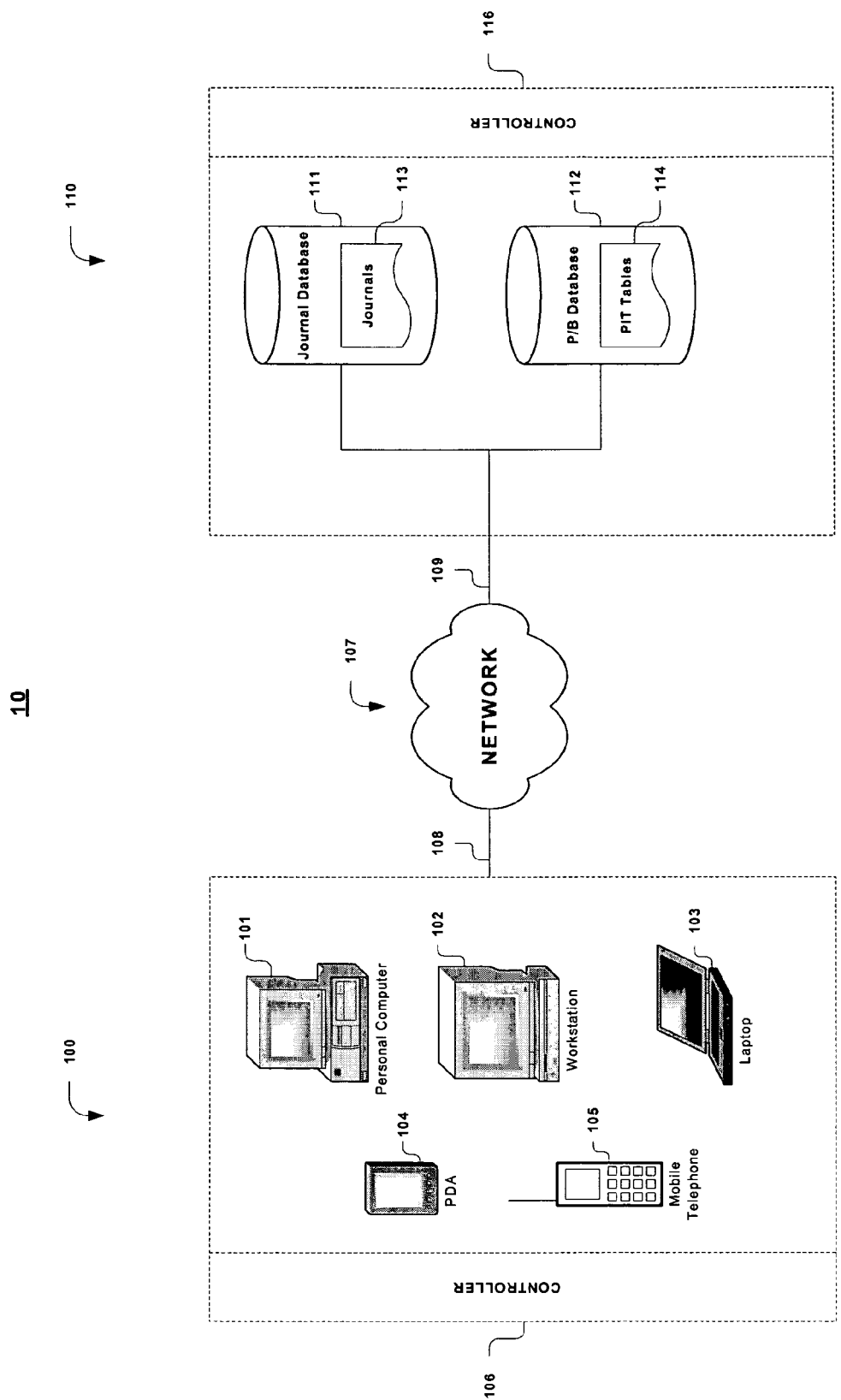
FIG. 1 illustrates a system according to one embodiment the present invention.

The present invention is directed to systems and methods for organizing and operating on data representing account balances and securities positions. For simplicity, the basic components of such systems and methods are provided. However, as would be understood by one of ordinary skill in the art, the systems and methods described below may include various other structures and/or processes in actual implementation.

Aspects of the present invention may involve both performing as-of processing and as-on processing. In general, balance and position adjustments with any effective date (i.e., past, present or future) are processed such that at any point in time, a particular position or balance may be reported "as-on" or "as-of" a given date. An as-on position or balance is the value as it was known at the end of the given processing date. An as-of position or balance is the value in effect on a given date taking into consideration all relevant adjustments, including those that were applied subsequent to that date.

Aspects of the present invention also may involve performing gapping processing. In general, a response must be provided to any position or balance query involving any current or future date, or any past date that falls within a retention schedule. The retention schedule may be set, for example, to provide responses for the previous 62 days, previous 36 month-ends, and previous 10 year-ends. The gapping process may consolidate consecutive records in the position or balance time series so long as doing so does not eliminate day-by-day detail that would be required to meet the requirements of the retention schedule. As such, the gapping process eliminates records in order to keep the growth of databases under control. In turn, storage costs and processing costs are reduced since database operations are less expensive when applied to smaller tables.

Aspects of the present invention may involve performing period accumulations. In general, various period schedules (e.g., monthly, weekly, biweekly, daily, etc.) may be accommodated to keep track of positions and balances that "reset" from time to time. For example, a monthly accumulation resets to zero at the beginning of each month and provides a response to a query requesting a month-to-date balance for a particular account on a given date. Adjustments to period accumulations may be applied in accordance with closing rules that determine when one period ends and the next period begins.

Examples of closing rules include current-only, pure as-of, and cutoff. In a current-only scenario, each period is closed to updates as soon as it ends, and all updates are applied to their current period. In a pure as-of scenario, no period is ever closed for updates, and every update is applied to the period that contains its effective date. In a cutoff scenario, a grace period of a given number of days is allowed, during which adjustments with an effective date prior to the current period may be applied to the immediately preceding period.

FIG. 1 illustrates one embodiment of a Sparse Delta Model (SDM) system 10 for organizing and operating on data representing account balances and securities positions. In general, the SDM system 10 may be configured to create and maintain data records for days on which activity occurs, and the data in each record may contain the sum of all activity on that date.

As shown, the SDM system 10 includes a client system 100 for presenting information to and receiving information from a user. The client system 100 may include one or more client devices such as, for example, a personal computer (PC) 101, a workstation 102, a laptop computer 103, a network-enabled personal digital assistant (PDA) 104, and a network-enabled telephone 105. Other examples of a client device include, but are not limited to, a server, a microprocessor, an integrated circuit, or any other component, machine, tool, equipment, or some combination thereof capable of responding to and executing instructions.

In one implementation, the client system 100 operates under the command of a client controller 106. The broken lines are intended to indicate that in some implementations, the client controller 106, or portions thereof considered collectively, may instruct one or more elements of the client system 100 to operate as described. Examples of a client controller 106 include, but are not limited to a computer program, a software application, computer code, set of instructions, plug-in, applet, microprocessor, virtual machine, device, or combination thereof, for independently or collectively instructing one or more computing devices to interact and operate as programmed.

The client controller 106 may be implemented utilizing any suitable computer language (e.g., C, C++, Java, JavaScript, Visual Basic, VBScript, Delphi) and may be embodied permanently or temporarily in any type of machine, component, physical or virtual equipment, storage medium, or propagated signal capable of delivering instructions to a device. The client controller 106 (e.g., software application, computer program) may be stored on a computer-readable medium (e.g., disk, device, and/or propagated signal) such that when a computer reads the medium, the functions described herein are performed.

In general, the client system 100 may be connected through a network 107 having wired or wireless data pathways 108, 109 to host system 110. The network 107 may include any type of delivery system including, but not limited to a local area network (e.g., Ethernet), a wide area network (e.g. the Internet and/or World Wide Web), a telephone network (e.g., analog, digital, wired, wireless, PSTN, ISDN, and/or xDSL), a packet-switched network, a radio network, a television network, a cable network, a satellite network, and/or any other wired or wireless communications network configured to carry data. The network 107 may include elements, such as, for example, intermediate nodes, proxy servers, routers, switches, and adapters configured to direct and/or deliver data.

In general, the client system 100 and the host system 110 each include hardware and/or software components for communicating with the network 107 and with each other. The client system 101 and host system 110 may be structured and arranged to communicate through the network 107 using various communication protocols (e.g., HTTP, TCP/IP, UDP, WAP, WiFi, Bluetooth) and/or to operate within or in concert with one or more other communications systems.

In one implementation, the host system 110 operates under the command of a host controller 116. The broken lines are intended to indicate that in some implementations, the host controller 116, or portions thereof considered collectively, may instruct one or more elements of host system 110 to operate as described. Examples of a host controller 116 include, but are not limited to a computer program, a software application, computer code, set of instructions, plug-in, applet, microprocessor, virtual machine, device, or combination thereof, for independently or collectively instructing one or more computing devices to interact and operate as programmed.

In general, host controller 116 may utilize any suitable algorithms, computing language (e.g., C, C++, Java, JavaScript, Visual Basic, VBScript, Delphi), and/or object-oriented techniques and may be embodied permanently or temporarily in any type of computer, computer system, device, machine, component, physical or virtual equipment, storage medium, or propagated signal capable of delivering instructions. The host controller 116 when implemented as software or a computer program, for example, may be stored on a computer-readable medium (e.g., device, disk, or propagated signal)

such that when a computer reads the medium, the functions described herein are performed.

The host system 110 generally provides a set of resources for a group of users. As shown, the host system 110 may include a journal database 111 and a position/balance (P/B) database 112. In one implementation, the journal database 111 and P/B database 112 may exist on one or more servers (e.g., IBM® OS/390 operating system servers, Linux operating system-based servers, Windows NT™ servers) within the host system 110.

In one embodiment, the journal database 111 may be configured to maintain journals 113 for recording detailed adjustments to positions and/or balances. The journals 113 may be used, for example, to reconstruct activity for a given account. The P/B database may be configured to maintain point-in-time (PIT) tables 114 for recording adjustments to positions and/or balances. In general, the PIT tables 114 will includes less detail than the journals 133 enabling queries to be processed more efficiently.

Figure 2:
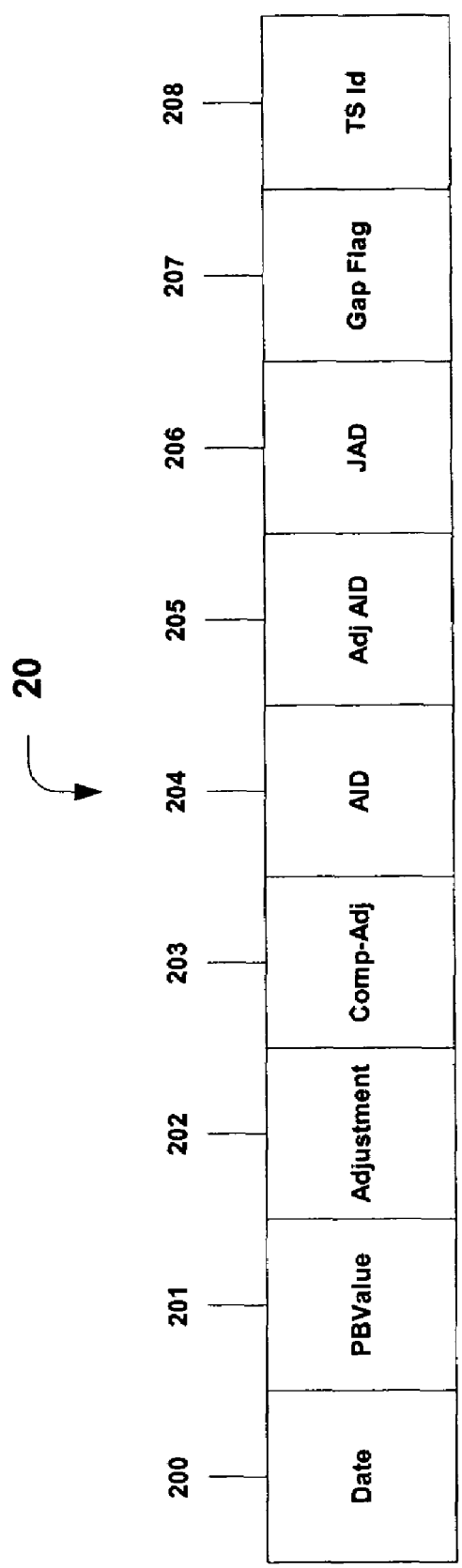
FIG. 2 illustrates a record format according to one embodiment the present invention.

FIG. 2 illustrates one embodiment of a record format 20 that may be used to store position and/or balance data. In one implementation, the record format 20 may be used by the SDM system 10 to store records in one or more PIT tables 114.

As shown, the record format 20 includes a Date field 200, a Position Balance Value (PBValue) field 201, an Adjustment field 202, a Compensating Adjustment (Comp-Adj) field 203, an Accounting Impact Date (AID) field 204, an Adjustment Accounting Impact Date (Adj AID) field 205, a Journal Activity Date (JAD) field 206, a Gap Flag field 207, and a Time Series Identifier (TS Id) 208.

In one implementation, the Date field 200, the AID field 204, the Adj AID field 205, and the JAD field 206 may be structured and arranged to receive data representing a date (e.g., mm/dd/yy). The PBValue field 201, the Adjustment field 202, and the Comp-Adj field 203 may be structured and arranged to receive data representing an amount or quantity (e.g., #,###.##). The Gap Flag field 207 may be structured and arranged to receive data representing an indicator (e.g., 1 or 0, A or G). The TS Id field 208 may be structured and arranged to receive data representing an alphanumeric key (e.g., period id, account id, asset id) for identifying a time series to which the record belongs. The key may include one or more values, columns, or fields for correlating the record with a particular account and/or time series. Other fields may be included in the record format 20 depending upon the particular application.

In one embodiment, the record format 20 may contain data for activity records and/or gap records. In general, an activity record may be used to accumulate activity posted to a particular date. A gap record may result from the archiving of one or more consecutive activity records and may summarize the activity formerly represented by those records.

In an activity record, for example, the Date field 200 may include the date of activity, the PBValue field 201 may include the net sum of activity on the date, the Adjustment field 202 may include the sum of activity for the date that was applied on subsequent processing dates, and the Comp-Adj field 203 may include the negative sum of activity for prior processing dates that was applied on this date. The AID field 204 may include the latest accounting impact date among all journals affecting the PBValue for the record, the Adj AID field 205 may include the latest accounting impact date among all journals affecting the adjustment of the record, and the JAD field 206 may include the latest processing date among all journals affecting the PBValue for the record. The Gap Flag field 207 may include a value of "0" or "A" indicating the record is an activity record.

In a gap record, the Date field 200 may include the first date of the gap summarized by the record, the PBValue field 201 may include the sum of PBValues from activity records that were rolled into the gap record, the Adjustment field 202 may include the sum of adjustment values from activity records that were rolled into the gap record, and the Comp-Adj field 203 may include the sum of Comp-Adj values from activity records that were rolled into the gap record. The AID field 204 may include the maximum AID value from activity records that were rolled into the gap record, the Adj AID field 205 may include the maximum Adj AID value from activity records that were rolled into the gap record, and the JAD field 206 may include the maximum JAD value from activity records that were rolled into the gap record. The Gap Flag field 207 may include a value of "1" or "G" indicating that the record is a gap record.

Figure 3:
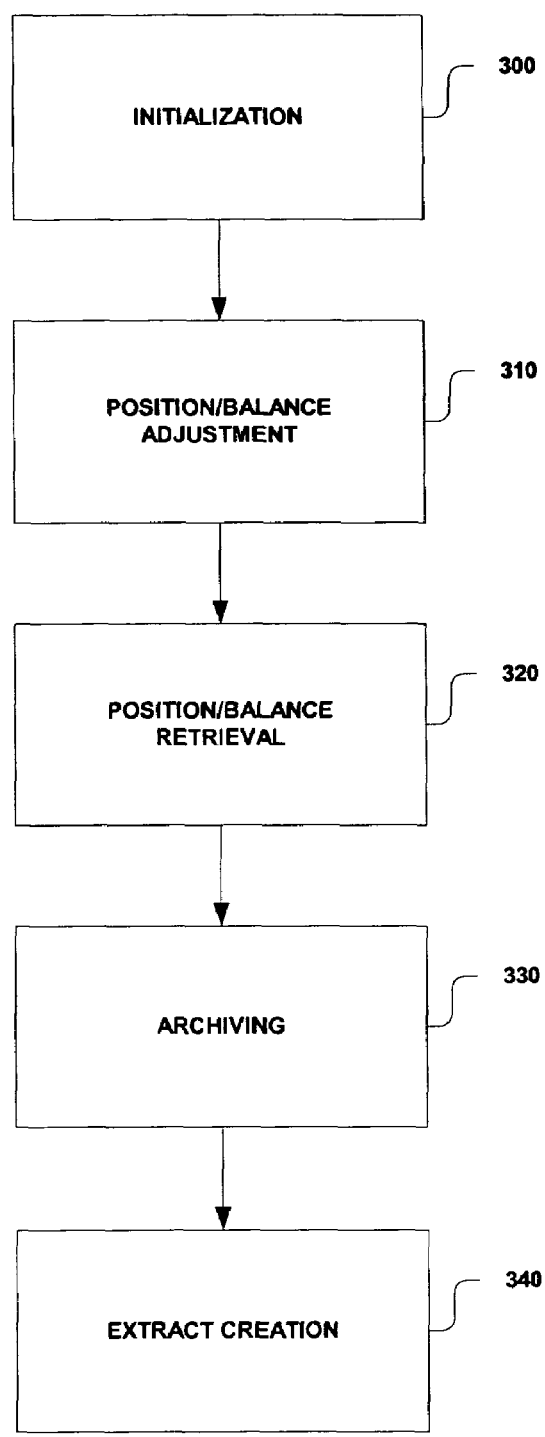
FIG. 3 illustrates a processing method according to one embodiment the present invention.

The operation of the SDM system 10 will now be described. In particular, a processing method 30 for organizing and operating on data representing account balances and securities positions is illustrated in FIG. 3. The processing method 30 may be implemented by any suitable type of hardware (e.g., device, computer, computer system, equipment, component); software (e.g., program, application, instruction set, code); storage medium (e.g., disk, device, propagated signal); or combination thereof. For example, the method 30 may be performed by one or more elements of the SDM system 10 and may employ the record format 20.

As shown in FIG. 3, the processing method 30 generally may include initialization (step 300), position/balance adjustment (step 310), position/balance retrieval (step 320), archiving (step 330), and/or extract creation (step 340).

Initialization (step 300) may be required in some implementations in order to initially load data from a pre-existing system. In one implementation, initial data may be loaded into gap records, which are designed to represent net activity spanning multiple active dates. In some cases, a "beginning-of-time" value (e.g., Jan. 1, 0001) is used as a date stamp for the record. Using such as value generally causes all queries for positions and balances prior to initialization to fail. However, inserting a zeros record (i.e. a record having default or zero values) for the initialization date, allows queries for the initialization date and all subsequent dates to be satisfied.

FIG. 4 illustrates one embodiment of an initial state table 40 that may be used for initializing a transferred balance. As shown, the initial state table 40 includes a gap record 400 and a zeros record 401. The gap record 400 includes a "beginning-of-time" value for the Date and the Adj AID, the transferred balance for the PBValue 201, and the initialization date for the AID and the JAD. The zeros record 401 includes the initialization date for the Date and the "beginning-of-time" value for the AID, the Adj AID, and the JAD.

Position/balance adjustment (step 310) generally may involve posting a journal representing transaction data for a particular business event. One example of a business event is a securities trade. The journal may include transaction data for adjusting one or more accounts (e.g., customer account, proxy account, share account, accounts payable account, commission account, taxes account, fees account, etc.) relevant to the securities trade.

In one implementation, position/balance adjustment (step 310) may include posting a current-day journal, posting a future-dated journal and/or posting a back-dated journal. In this implementation, the type of journal is defined by the relationship between the processing date of a journal for adjusting a position or balance and the relevant business date (delta date) on which the adjustment has an accounting impact, had an accounting account, or should have an accounting impact. Namely, a current-day journal has a delta date d that is the same as the processing date p, a future-dated journal has a delta date d that is later than the processing date p, and a back-dated journal has a delta date d that is earlier than the processing date p.

In one embodiment, to post to a current-day journal (d=p), the following steps are performed:

1. Locate or create if it does not exist, the activity record for date p.
2. Add x to the PBValue[p].
3. Set AID[p]=max(p, AID[p]).
4. Set JAD[p]=p.

For example, consider the following journals:

J1: Add $10 as-of 3/18, posted on 3/18
J2: Add $20 as-of 3/18, posted on 3/18

Referring to FIG. 5A, a PIT table 50*a* is shown that results following posting of the current-day journal J1. As shown, the PIT table 50*a* includes an activity record 500 with values of: Date=Mar. 18, 2002, PBValue=10, Adjustment=0, Comp-Adj=0, AID=Mar. 18, 2002, Adj AID=Jan. 1, 0001, JAD=Mar. 18, 2002, and Gap Flag=0.

Referring to FIG. 5B, a PIT table 50*b* is shown that results following posting of the current-day journal J2. As shown, the PIT table 50*b* includes an updated activity record 500. The values of updated activity record 500 have been changed to: Date=Mar. 18, 2002, PBValue=30, Adjustment=0, Comp-Adj=0, AID=Mar. 18, 2002, Adj AID=Jan. 1, 0001, JAD=Mar. 18, 2002, and Gap Flag=0.

In one implementation, to post a future-dated journal (d>p), the following steps are performed:

1. Locate or create the activity record for date d.
2. Add x to PBValue[p].
3. Set AID[d]=max(d, AID [d]).
4. Set JAD[d]=p.

Continuing the previous example, consider the following journal:

J3: Add $5 as-of 3/25, posted on 3/18

Referring to FIG. 5C, a PIT table 50*c* is shown that results following posting of the future-dated journal J3. As shown, the PIT table 50*c* includes the activity record 500 as well as a new activity record 501 with values of: Date=Mar. 25, 2002, PBValue=5, Adjustment=0, Comp-Adj=0, AID=Mar. 25, 2002, Adj AID=Jan. 1, 0001, JAD=Mar. 18, 2002, and Gap Flag=0.

In one implementation, to post a back-dated journal (d<p), the following steps are performed:

1. Locate or create a record for date d. If creating a record, make it an activity record if d is currently a retention date; otherwise make it a gap record.
2. Locate or create the activity record for date p.
3. Add x to Adjustment[d].
4. Add x to PBValue[p].
5. Subtract x from Comp-Adj[p].
6. Set Adj-AID[d]=p.
7. Set AID[p]=max(p, AID[p]).
8. Set JAD[p]=p.

As indicated, the Adjustment value on date d is updated rather than the PBValue value because a back-dated journal was not reflected in the end-of-day values as reported on date d. Since this journal should be reflected in the end-of-day value for the posting date p, however, the PBValue value for date p must be updated. Finally, in order to cancel the effect of Adjustment[d] beginning on date p (the first date on which the value is part of the as-on value, not just the as-of value), a compensating update is made to Comp-Adj[p].

Continuing that previous example, consider the following journals:

J4: Add $10 as-of 3/15, posted on 3/20
J5: Deduct $5 as-of 3/18, posted on 3/20

Referring to FIG. 5D, a PIT table 50*d* is shown that would result following the posting of the back-dated journal J4. As shown the PIT table 50*d* includes activity records 500, 501 (as in PIT table 50*c*) and new activity records 502, 503. The activity record 502 includes values of: Date=Mar. 15, 2002, PBValue=0, Adjustment=10, Comp-Adj=0, AID=Jan. 1, 0001, Adj AID=Mar. 20, 2002, JAD=Jan. 1, 0001 and Gap Flag=0. The activity record 503 includes values of: Date=Mar. 20, 2002, PBValue=10, Adjustment=0, Comp-Adj=−10, AID=Mar. 20, 2002, Adj AID=Jan. 1, 0001, JAD=Mar. 20, 2002, and Gap Flag=0.

Referring to FIG. 5E, a PIT table 50*e* is shown that results following posting of the back-dated journal J5. As shown, the PIT table 50*e* includes activity records 501, 502 (as in PIT table 50*d*) and updated activity records 500, 503. The updated activity record 500 includes values of: Mar. 18, 2002, PBValue+30, Date=30, Adjustment=−5, Comp-Adj=0, AID=Mar. 18, 2002, Adj AID=Mar. 20, 2002, JAD=Mar. 18, 2002, and Gap Flag=0. Updated activity record 503 includes values of: Date=Mar. 20, 2002, PBValue=5, Adjustment=0, Comp-Adj=−5, AID=Mar. 20, 2002, Adj AID=Jan. 1, 0001, JAD=Mar. 20, 2002, and Gap Flag=0.

Position/balance retrieval (step 320) generally may involve obtaining one or more values for a given date. In one implementation, position/balance retrieval (step 320) may include obtaining as-on values, obtaining as-of values, obtaining net adjustments, obtaining latest journal accounting impact date (LJAID), and/or obtaining latest journal activities date (LJAD).

The as-on value for a given date is the net value at end-of-day as reported on that date. That is, it excludes adjustments that were posted on a subsequent date. In one embodiment, the as-on value for date d is obtained by summing all PBValue values up to and including date d. The following formula is representative: As-on (d)=sum(PBValue[x]), where x<=d.

In general, the as-on value is available for reporting as long as the latest contributing record was an activity record, not a gap record. Otherwise, the value should be reported as unavailable, as the query date is within a gap representing archived activity records. It should be noted that there is no as-on value for the current or any future date, since end-of-day has not occurred for such dates. Nevertheless, it can be seen that the Adjustment and Comp-Adj values in the as-of formula (below) will always sum to zero when querying current or future dates. Hence, the as-on formula may be used safely for all current-date or future-date queries.

The as-of value for a given date is the net value at end-of-day on that date, including all data available at the time of query. That is, the as-on value for a given date includes adjustments and compensating adjustments that were posted subsequent to that date. As in the case for obtaining as-on values, the as-of value is reported as unavailable if the latest contributing record was a gap record.

In one embodiment, the as-of value for date d is obtained by summing all PBValue, Adjustment, and Comp-Adj values up to and including date d. The following formula is representative: As-of(d)=sum(PBValue[x]+Adjustment[x]+Comp-Adj [x]), where x<=d.

Total adjustments is the sum of all activity posted to prior dates but which posted late (e.g., back-dated journals). The total adjustments value for date d is obtained by summing all Adjustment values up to and including date d. The following formula is representative: TotAdj(d)=sum(Adjustment[x]), where x<=d Net Adjustments is the sum of all activity posted to prior dates but was processed after the query date. This includes all activity from prior dates that did not make it into the end-of-day report for the query date. In one embodiment, the net adjustments value for date d is obtained by taking the difference between the as-of and as-on values for date d. The following formulas are representative: NetAdj(d)=As-of(d)−As-on(d), where x<=d or NetAdj(d)=sum(Adjustment[x]+Comp-Adj[x], where x<=d.

The latest journal accounting impact date (LJAID) may be used to summarize dates related to the journal updates contributing to a given reported position or balance. For both an as-on or as-of query for a particular date, the LJAID is the latest date among the accounting impact dates (AIDs) of the journal updates that impact the result of the query. Recall that the AID for a journal is the same as its processing date for a current-day journal and a back-dated journal. For a future-dated journal, the AID is the delta date of the journal. It should also be noted that whenever a new activity record is created, the AID and Adj AID values are both set to the "beginning-of-time" date (e.g., Jan. 1, 0001). The queries for LJAID relate directly to the as-on and as-of value formulas as follows:

As-on-LJAID(d)=max(AID)[x]), where x<=d.
As-of-LJAID(d)=max(max(AID[x], Adj-AID[x])), where x<=d.

The latest journal activity date (LJAD) also may summarize dates related to the journal updates contributing a given reported position or balance. The only difference between LJAD and LJAID is that LJAD is based on the processing dates of the contributing journals, whereas LJAID is based on AID. The queries for LJAD relate directly to the as-on and as-of value formulas, as follows:

As-on-LJAD(d)=max(JAD[x]), where x<=d.
As-of-LJAD(d)=max(max(JAD[x], Adj-AID[x])), where x<=d.

To report LJAID and LJAD values for both as-on and as-of queries, there is no need for an "Adj JAD" field capturing the latest processing date among all journals affecting the Adjustment value for the record. The reason is that this value is provably the same as the date captured in the Adj AID field. As such, Adj AID may be used to calculate both LJAID and LJAD for as-of queries.

Archiving (step 330) generally may involve removing activity records and leaving behind gap records, when those activity records are no longer required in order to respond to any queries pertaining to retention dates. In one implementation, a retention schedule includes the most recent 62 processing dates, 36 month-end dates, and 10 year-end dates as retention dates. All other dates are not required retention dates.

In order to illustrate archiving actions, first consider the following journals for continuing the previous example:

J6: Add $10 as-of 3/22, posted on 3/22
J7: Deduct $5 as-of 3/25, posted on 4/2
J8: Add $10 as-of 4/25, posted on 4/25

Referring FIG. 5F, a PIT table 50f is shown that would result following posting of the current-day journal J6, the back-dated journal J7, and the current-day journal J8. As shown, the PIT table 50f includes activity records 500, 502, 503 (as in PIT table 50e), an updated activity record 501, and new activity records 504-506. The updated activity record 501 includes values of: Date=Mar. 25, 2002, PBValue=5, Adjustment=−5, Comp-Adj=0, AID=Mar. 25, 2002, Adj AID=Apr. 2, 2002, JAD=Mar. 18, 2002, and Gap Flag=0. New activity record 504 includes values of Date=Mar. 22, 2002, PBValue=10, Adjustment=0, Comp Adj=0, AID Mar. 22, 2002, Adj AID=Jan. 1, 0001, JAD=Mar. 22, 2002, and Gap Flag=0. New activity record 505 includes values of: Date=Apr. 2, 2002, PBValue=−5, Adjustment=0, Comp-ADJ=5, AID=Apr. 2, 2002, Adj AID=Jan. 1, 0001, JAD=Apr. 2, 2002, and Gap Flag=0. New activity record 506 includes values of: Date=Apr. 25, 2002, PBValue=10, Adjustment-0, Comp-AdJ=0, AID=Apr. 25, 2002, Adj AID=Jan. 1, 0001, JAD=Apr. 25, 2002, and Gap Flag=0.

In general, when an activity record falls off the retention schedule, it may be archived by creating a gap record to absorb the PBValue, Adjustment, Comp-Adj, AID, Adj AID, and JAD values from the archived record. In some cases, the record immediately preceding the archived record already is a gap record. In such a case, the archived activity record data can be merged into the existing gap record, and the archived record can be deleted. Otherwise, the archived activity record may be converted to the required gap record by changing the Gap Flag indicator (e.g. 0 to 1, A to G).

Care must be taken to ensure that archiving and activity record does not make data for subsequent retention dates appear unavailable. To guard against this, a check must be made for the existence of an activity record for the next following retention date. If no such record exists, then archiving must create one having both PBValue and adjustments set to zero. Such a "zeros" record will move forward with subsequent archiving activity until the zeros record lands on a date with extended retention (e.g., a month-end date or year-end date). Barring future posted activity, neither gap records nor zeros records need be created from that point. It should be noted if there is no record for date d, then archiving date d cannot be performed. In particular, a zeros record will never be created in this case.

In one implementation, to archive an activity record for date d, the following steps are performed:

1. Locate the record r, if any, that immediately precedes date d.
2. If r exists and is a gap record, then:
   2.1. Add Adjustment[d] to Adjustment[r]
   2.2. Add Comp-Adj[d] to Comp-Adj[r]
   2.3. Add PBValue[d] to PBValue[r]
   2.4. Set AID[r] = max(AID[r], AID [d])
   2.5. Set Adj-AID[r] = max(Adj-AID[r], Adj-AID[d])
   2.6. Set JAD[r] = max(JAD[r], JAD [d])
   2.7. Delete the activity record for date d
3. Else:
   3.1. Change Gap Flag[d] to 1 (or G)
4. Let d' be the next retention date following d
5. If a record does not exist for date d' then:
   5.1. Create a new activity record for date d'
   5.2. Set Adjustment [d'] = PBValue[d'] = Comp-Adj[d']= 0
   5.3. Set AID [d'] = Adj-AID[d'] = JAD[d] = 01/01/0001

To illustrate gapping, consider the following archiving action:

A9: Archive 3/15 data

Referring to FIG. 5G, a PIT table 50g is shown that results following archiving action A9. As shown, the PIT table 50g includes activity records 500, 501, 503-506 (as in 50f), a new gap record 507 and a new zeros record 508. The gap record 507 includes values of: Date=Mar. 15, 2002, PBValue=0, Adjustment=10, Comp-Adj=0, AID=Jan. 1, 0001, Adj AID=Mar. 20, 2002, JAD=Jan. 1, 0001, and Gap Flag=1. The zeros record 508 includes values of: Date=Mar. 16, 2002, PBValue=0, Adjustment=0, Comp-Adj=0, AID=Jan. 1, 0001, Adj AID=Jan. 1, 0001, JAD=Jan. 1, 0001, and Gap Flag=0.

In the above example, the next retention date is 3/16, for which there is not an activity record. Accordingly, a zeros record for 3/16 must be created in addition to the gap record for the 3/15 data.

Continuing the previous example, consider the following archiving action:

A10: Archive 3/16 data

Referring to FIG. 5H, a PIT table 50*h* is shown that results following archiving action A10. As shown, the PIT table 50*h* is identical to PIT table 50*g* except that the zeros records 508 for 3/16 has been replaced a zeros records 509 for 3/17.

Continuing the previous example, consider the following archiving action:

All: Archive 3/17 data

Referring to FIG. 5I, a PIT Table 50*i* is shown that results following archiving action All. As shown, the PIT table 50*i* is identical to PIT table 50*h* except that the zeros record 509 vanishes. This is due to the fact that there is already an activity record for the next retention date (i.e., 3/18).

Continuing the previous example, consider the following archiving action:

A12: Archive date 3/18

Referring to FIG. 5J, a PIT table 50*j* is shown that results following archiving action A12. As shown, activity records 500 has been removed, the gap record 507 has been updated, and a new zeros record 510 has been created. The updated gap record 507 includes values of: Date=Mar. 15, 2002, PBValue=30, Adjustment=5, Comp-Adj=0, AID=Mar. 18, 2002, Adj AID=Mar. 20, 2002, JAD=Mar. 18, 2002, and Gap Flag=1. These values result from merging the data from the 3/18 activity record into the 3/15 gap record when 3/18 is archived.

Continuing the previous example, consider the following archiving action:

A13: Archive dates 3/19 through 3/30

Referring to FIG. 5K, a PIT table 50*k* is shown that results following archiving action A13. As shown, activity records 501, 503, 504 have been removed, gap record 507 has been updated, and zeros record 510 has been replaced by a new zeros record 511. Updated gap record 507 includes values of: Date=Mar. 15, 2002, PBValue=50, Adjustment=0, Comp-Adj=−5, AID=Mar. 25, 2002, Adj AID=Apr. 2, 2002, JAD=Mar. 22, 2002, and Gap Flag=1. New zeros record 511 includes values of: Date=Mar. 31, 2002, PBValue=0, Adjustment=0, Comp Adj=0, AID=Jan. 1, 0001, Adj AID=Jan. 1, 0001, JAD=Jan. 1, 0001, and Gap Flag=0.

Continuing the previous example, consider the following archiving action:

A14: Archive date 4/2

Referring to FIG. 5L, a PIT table 50*l* is shown that results following archiving action A14. As shown, the PIT table 50*l* includes a new gap record 512 and a new zeros record 513. The gap record 512 includes values of: Date=Apr. 2, 2002, PBValue=−5, Adjustment=0, Comp-Adj=5, AID=Apr. 2, 2002, Adj AID=Jan. 1, 0001, JAD=Apr. 2, 2002, and Gap Flag=1. New zeros record 513 includes values of: Date=Apr. 3, 2002, PBValue=0, Adjustment=0, Comp-Adj=0, AID=Jan. 1, 0001, Adj AID=Jan. 1, 0001, JAD=Jan. 1, 0001, and Gap Flag=0.

In this case, the date 3/31 (a month-end) is a retention date and not (yet) subject to archiving. It will get archived, however, when it is 37 months old, for example. Archiving on 4/1 is unnecessary because there is no activity record for 4/1. Therefore, the next archiving activity occurs on 4/2. Because the preceding record is an activity record (3/31), the previous expansion of the 3/15 gap record stops, and a new gap record is established starting at 4/2.

Continuing the previous example, consider the following archiving action:

A15: Archive dates 4/3 through 4/29

Referring to FIG. 5M, a PIT table 50*m* is shown that results following archiving action A15. As shown, the PIT table 50*m* includes only gap record 507, zeros record 511, updated gap record 512, and new zeros record 514. Updated gap record 512 includes values of: Date=Apr. 2, 2002, PBValue=5, Adjustment=0, Comp-Adj=5, AID=Apr. 25, 2002, Adj AID=Jan. 1, 0001, JAD=Apr. 25, 2002, and Gap Flag=1. New zeros record 514 includes values of: Date=Apr. 30, 2002, PBValue=0, Adjustment=0, Comp-Adj=0, AID=Jan. 1, 0001, Adj AID=Jan. 1, 0001, JAD=Jan. 1, 0001 and Gap Flag=0.

When an activity record is archived, it may be the case that the following record is a gap record. In this case, archiving may result in two consecutive gap records. At the time of archive, or later (e.g., using a periodic off-hours sweep), consecutive gap records can be merged.

In one implementation, to merge gap records, the following steps are performed:

1. Let d1 and d2 be the respective dates of the gap records.
2. Add PBValue[d2] to PBValue[d1]
3. Add Adjustment[d2] to Adjustment[d1]
4. Add Comp-Adj[d2] to Comp-Adj [d1]
5. Set AID[d1]=max(AID[d1], AID [d2])
6. Set Adj-AID[d1]=max(Adj-AID [d1], Adj-AID[d2])
7. Set JAD[d1]=max(JAD[d1], JAD[d2])
8. Delete the record dated d2

For example, consider previous example when it is time to archive the 3/31 record on the day it becomes 37 months old. That archiving action is as follows:

A16: Archive date 3/31

Referring to FIG. 5N, a PIT table 50*n* is shown that results following archiving action A16. As shown, the PIT table 50*n* includes consecutive gap records 507, 512. Upon detection, the following merging operation may be performed:

M17: Merge gap at 3/15 and 4/2

Referring to FIG. 5O, a PIT table 50*o* is shown that results following merging operation M17. As shown, the PIT table 50*o* includes only updated gap record 507 and zeros record 514. The updated gap record 507 includes values of: Date=Mar. 15, 2002, PBValue=55, Adjustment=0, Comp-Adj=0, AID=Apr. 25, 2002, Adj AID=Apr. 2, 2002, JAD=Apr. 25, 2002, and Gap Flag=1.

As described, archiving (step 330) reduces data base size by eliminating data from positions and balances. As consequence, it may be necessary to perform reconstruction in order to respond to queries for certain dates. In general, reconstruction processing may involve retrieving transaction data for the last date on which an answer is available and using an audit trail of journals that were applied in order to get back to the date of the query.

Extract creation (step 340) generally may involve extracting data that represents the net change between the end-of-day (EOD) values for the previous day and the EOD values for the current day for each account having any activity. In one implementation, EOD values for date d are computed from EOD values for date d−1 as follows:

1. For each position/balance series that has a record for date d, set EOD[d]=EOD[d−1]+PBValue [d]
2. For all other position/balance series, set EOD[d]=EOD [d−1]

In some embodiments, the processing method 30 may involve period accumulation (PA) processing for representing position or balance accumulations within distinct periods of time, rather than along the entire lifetime of the position or balance. In general, any period schedule (e.g., monthly, weekly, bi-weekly, daily, etc.) may be accommodated to keep track of positions and balances that "reset" from time to time. For example, a monthly accumulation resets to zero at the beginning of each month and provides an answer to a query for a month-to-date balance for a particular account on a given date.

Figure 6:
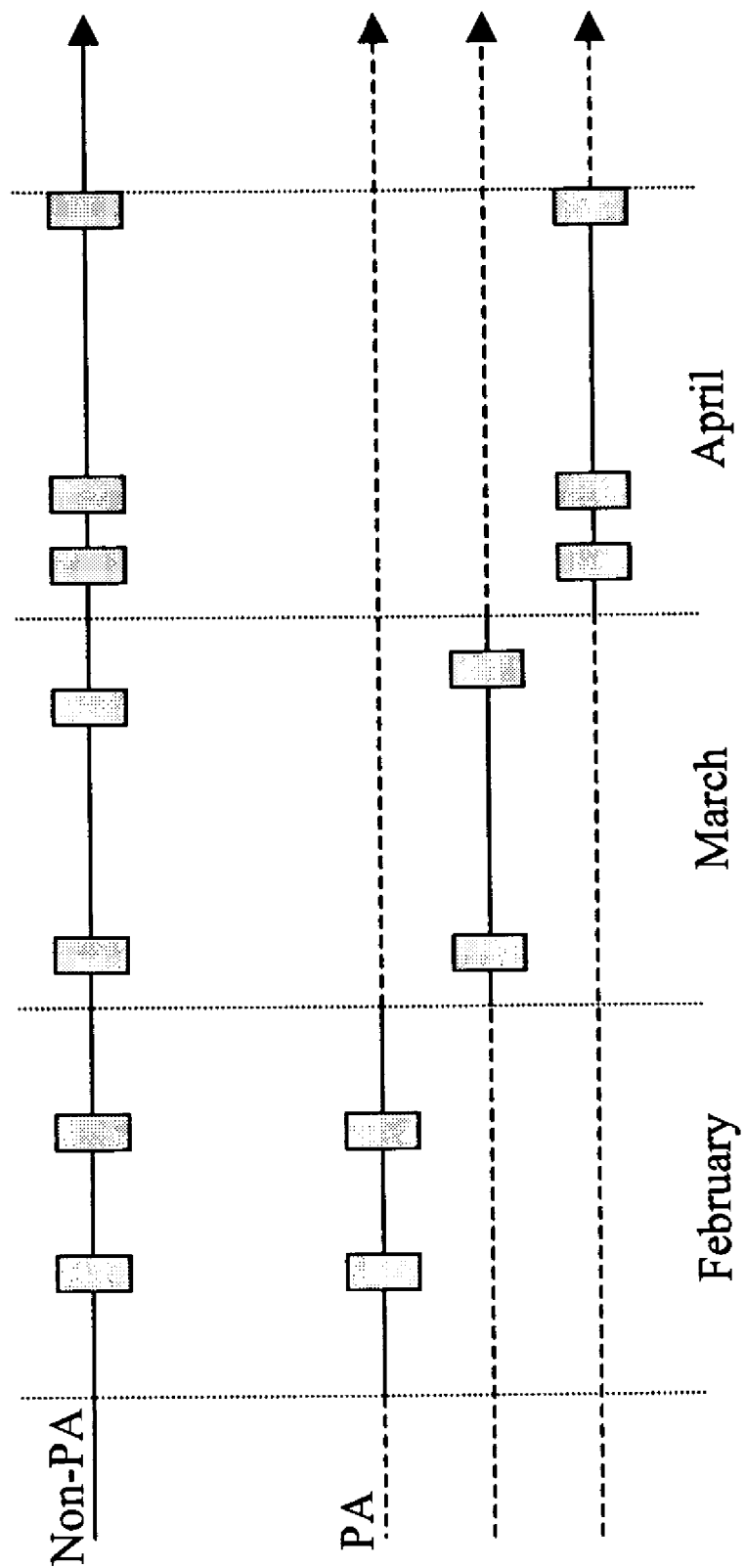
FIG. 6 illustrates period accumulation according to one embodiment of the present invention.

FIG. 6 illustrates one example of how position/balance records for a non-PA and monthly PA balance would be maintained. As shown, posting activity in the case of the non-PA balance appears in a single time series. In one implementation, a PA may be represented in exactly the same way as a non-PA, except that a separate time series is created for each period in the period schedule. Thus, an aspect of PA posting that is not present for non-posting is the question of to which time series, the activity should be posted. This question does not arise for a non-PA because there is a single time series covering all time. In contrast, a single PA is represented by a succession of independent time series. Therefore, any query issued against a time series will be affected by all activity up to and including the query date.

For example, in the monthly PA shown in FIG. 6, each month is kept as its own distinct time series, and each activity is posted only to one of those time series, according to the posting rules. Thus, a query issued against the March time series will be affected only by activity posted in March. February activity will not be included. In effect, the accumulation is "reset" at the beginning of each period, though this reset is accomplished by the establishment of a new, independent time series of data, rather than by the actual setting of zero by any data element.

For current-dated PA activity, a journal will always post into the time series for the current period using the same posting logic as for non-PAs. For instance, to post a current-day journal to a PA (e.g., a journal having a processing date p showing an adjustment of x with delta date d=p), the posting period will be the period containing p.

For future-dated PA activity, the journal will always post into the time series for the period defined by the delta date. For instance, to posting a future-dated journal to a PA (e.g., a journal having a processing date p showing an adjustment of x with a delta date d>p), the posting period will be the period containing d.

For back-dated PA activity, however, there are three possibilities, depending on the closing model defined for the PA. In particular, for a current-only PA, all back-dated posting goes into the current period. This is used when prior periods must be considered closed out and frozen as soon as a new period starts. For instance, to post a back-dated journal to a current-only PA (e.g., a journal having a processing date p showing an adjustment of x with a delta date d<p), the posting period will be the period containing p.

For a pure as-of PA, all back-dated posting goes into the period defined by the delta date. This is used when prior periods may be kept open for adjustments indefinitely. For instance, to post a back-dated journal to a pure as-of PA (e.g., a journal having a processing date p showing an adjustment of x with a delta date d<p), the posting period will be the period containing d.

For a cutoff PA, back-dated posting that is processed within a grace period at the end of a period may be posted into that period. This approach is very similar to the current-only scheme, but it allows a period to stay open for a few extra days. During the grace period, activity that would have been posted into the prior period under the current-only model, had it arrived before period end, is still posted into that prior period. For instance, to post a back-dated journal to a cutoff PA before cutoff (e.g., a journal having a processing date p showing an adjustment of x with a delta date d<p and with p<c where c is the cutoff date in the period containing p and with d and p falling into different periods), the processing period will be the period immediately proceeding the period containing p.

Beyond the grace period, all back-dated posts are made to the current period. That is, once the prior period closes, this scheme acts like current-only. For instance, to post a back-dated journal to a cutoff PA after cutoff (e.g., a journal having a processing date p showing an adjustment of x with delta date d<p and with p>=c, where c is the cutoff date in the period containing p), the posting period will be the period containing p.

It should be noted that a journal posted to a PA is always posted to a single period, i.e., a single time series, for that PA. In this process, either one or two records will be created or updated in the time series, corresponding to one or both of the delta date and the processing date. One (or even both, in the case of the cutoff) of these dates may lie outside the date range represented by the period into which the journal is posted provided that all position/balance queries are directed to the time series containing the query date.

In general, archiving for PA position/balance records is substantially the same as for non-PA records. However, archiving must process each time series for a given PA balance or position independently. In addition, there are two special considerations for PAs. Namely, archiving is never applied to daily PAs. For one, doing so would add little value, as in the vast majority of cases, the result would be the mere changing of activity records into gap records, with no record deletion at all. The only opportunity for actual record reduction would occur if back- or future-dated journals were posted, and the expected savings would be minimal.

Secondly, entire PA time series are deleted from the database when their associated periods become sufficiently old. This is to prevent unbounded growth of the data caused by unchecked growth in the number of periods retained. Each period would require at least one, and often two, permanent records. In the case of daily PAs, the unchecked growth will be considerable. In one implementation, the deletion of PA periods would be done based on a separate retention policy that identifies how many periods are to be retained for each period duration code (e.g., 30 daily periods, 24 monthly periods, and 10 yearly periods). Periods would be deleted periodically in order to keep period reduction in line with this policy.

Initialization for PA records may be performed in the same way as for non-PA records. Namely, initialization records are created in the period defined by the last activity date obtained for any given PA.

Extract creation for PAs is, for the most part, performed the same way as for non-PAs, with current activity pulled from the current period. However, on any period start date, the EOD values for all PAs based on that period must be reset to the activity for the day, discarding the prior EOD values. This may be done by zeroing the prior day EOD values for PAs whose periods are resetting first, before adding activity for the current day.

In some embodiments, a given position or balance may be linked to the journals relevant to the given position or balance. For example, as-on or as-of values may be related to the contributing journals by drilling down from PAs to journals. In one implementation, this process is performed as follows:

Assume as-of or as-on query for query date q and let:
Q=period containing date q
s=start date of period Q
e=end date of period Q c=cutoff date of period Q
Q'=period immediately following period Q
s'=start date of period Q'
e'=end date of period Q'
c'=cutoff date of period Q'
Further, for any journal under consideration, let:
d=journal delta date
p=journal processing date In general, no journal with a delta date after q can affect an as-on or as-of value for date q, so all such journals can be excluded. In addition, the as-on value for date q can only be affected by journals that are processed on or before q so journals with processing date after q can be ignored for as-on.

To drill-down on a current-only PA as-of value, journals posted into period Q include all current-dated and back-dated journals with processing date in Q, as well as future-dated journals with delta date in Q. In this case, journals are selected where (p>=s and p<=e and d<=q) or (p<s and d>=s and d<=q).

To drill-down on a current-only PA as-on value, the same process as for as-on is performed with the added constraint that processing date must not follow q. Thus, journals are selected where (p>=s and p<=q and d<=q) or (p<s and d>=s and d<=q).

To drill-down on a pure as-of PA as-of value, journals posted into period Q include all journals with delta date in Q. In this case, journals are selected where d>=s and d<=q.

To drill-down on a pure as-of PA as-on value, the same process is performed as for as-of but excluding journals processed after q. Thus, journals are selected where d>=s and d<=q and d<=q.

To drill-down on a cutoff PA as-of value, any current-dated journal with processing date (and delta date) in Q is posted into Q. Future-dated journals with delta date in Q are also posted into Q, regardless of processing date. Back-dated journals are posted into Q if either (a) processing date is in Q but proceeds cutoff, and delta date is in Q; or (b) processing date follows current period cutoff but proceeds next period cutoff, and delta date falls in Q or any prior period. Thus, journals are selected where (p>=s and p<=e and p=d) or (d>=s and d<=q and p<d) or (p>=s and p<c and d>=s and d<=q) or (p>=c and p<c' and d<=q).

To drill-down on a cutoff PA as-on value, processing may be the same as for as-of and requiring that processing date precedes the query date. Thus, journals are selected where (p>=s and p<=q and d>=s and d<=q) or (d>=s and d<=q and p>d) or (p>=s and p<c and p<c and p<=q and d>=s and d<=q) or (p>=c and p<=q and d<=q).

One embodiment of a set of graphical user interfaces (GUIs) that may be presented to a user is illustrated in FIGS. 7A-7D. In general, the GUIs may be presented through an interactive computer screen to solicit information from and present information to a user in conjunction with the processing method 30 for organizing and operating on data representing account balances and securities positions. In one implementation, the UIs may be presented through a client system 100 including a personal computer running a browser application and having various input/output devices (e.g., keyboard, mouse, touch screen, etc.) for receiving user input.

Referring to FIGS. 7A-7D, columns with names ending with "QTY" or "AMT" show positions and balances, respectively, computed from tables (e.g., PIT tables 114) in the SDM system 10. Columns ending with "LJAD" are showing LJAD dates computed from the tables. Trade date (TD) and settlement date (SD) time dimensions are held as separate time series, so the GUIs may combine the results of separate queries into single rows in the display.

Figure 7A:
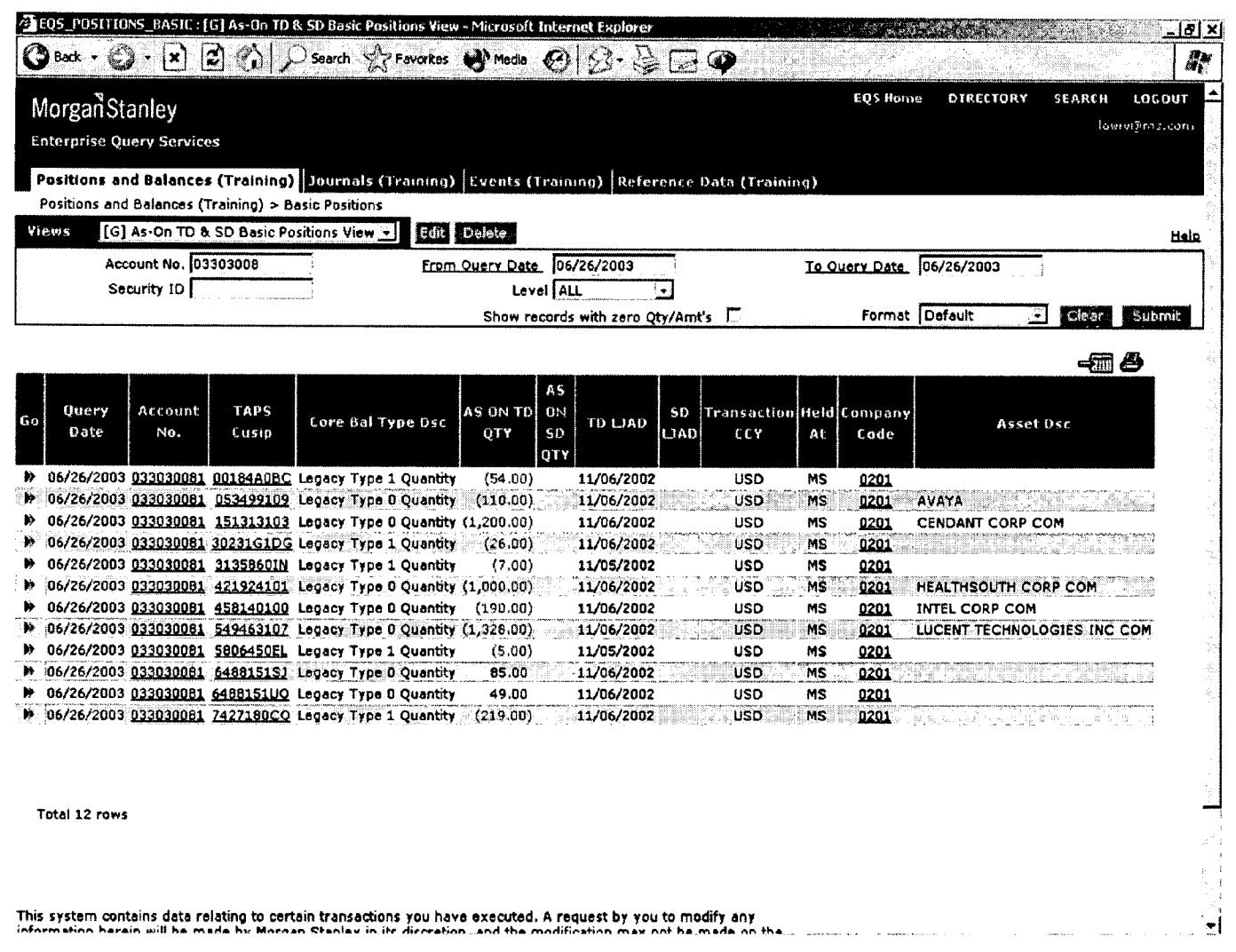

FIG. 7A illustrates one embodiment of a GUI that may be presented for performing a positions query on an account.

Figure 7B:
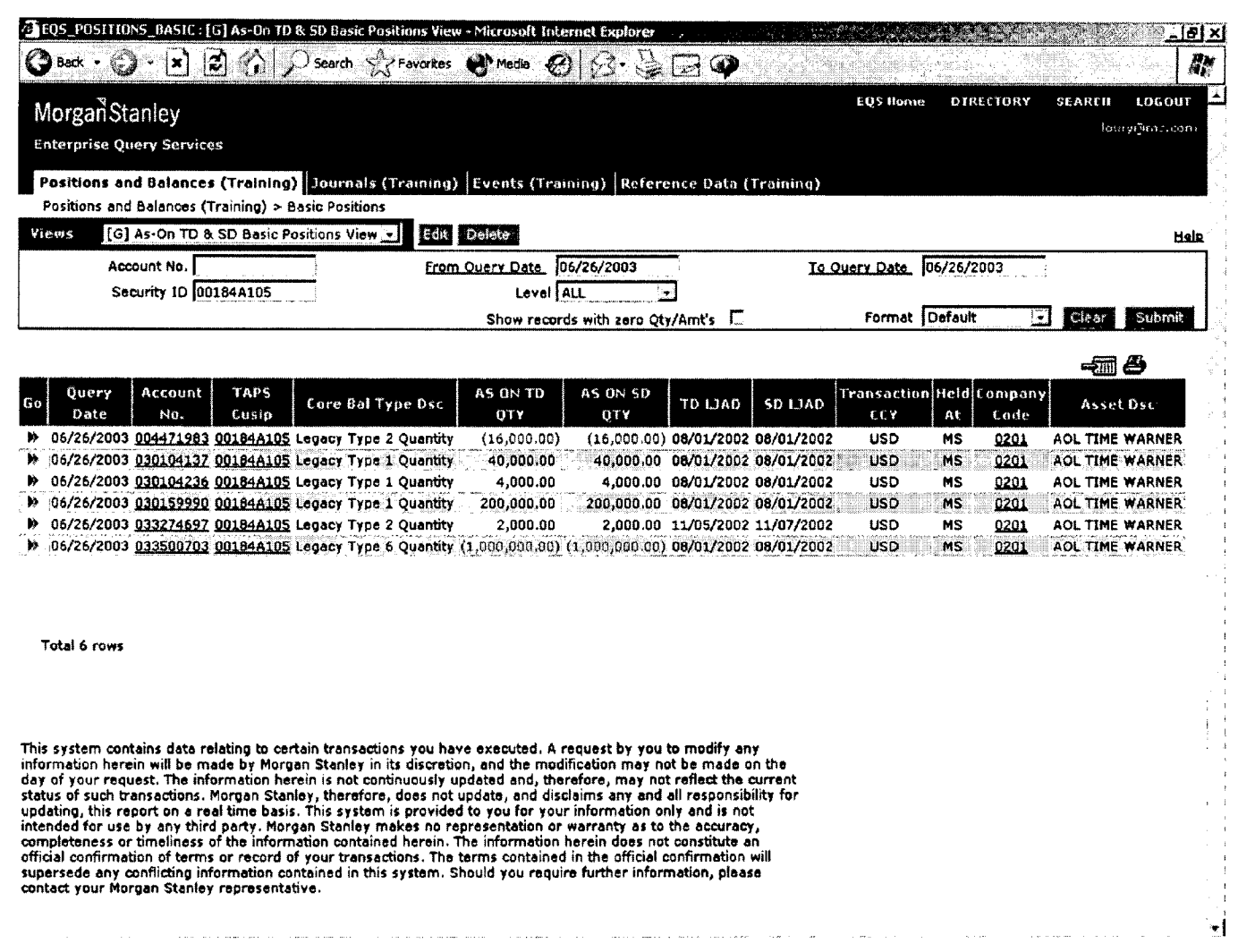

FIG. 7B illustrates one embodiment of a GUI that may be presented for performing a positions query on a security.

Figure 7C:
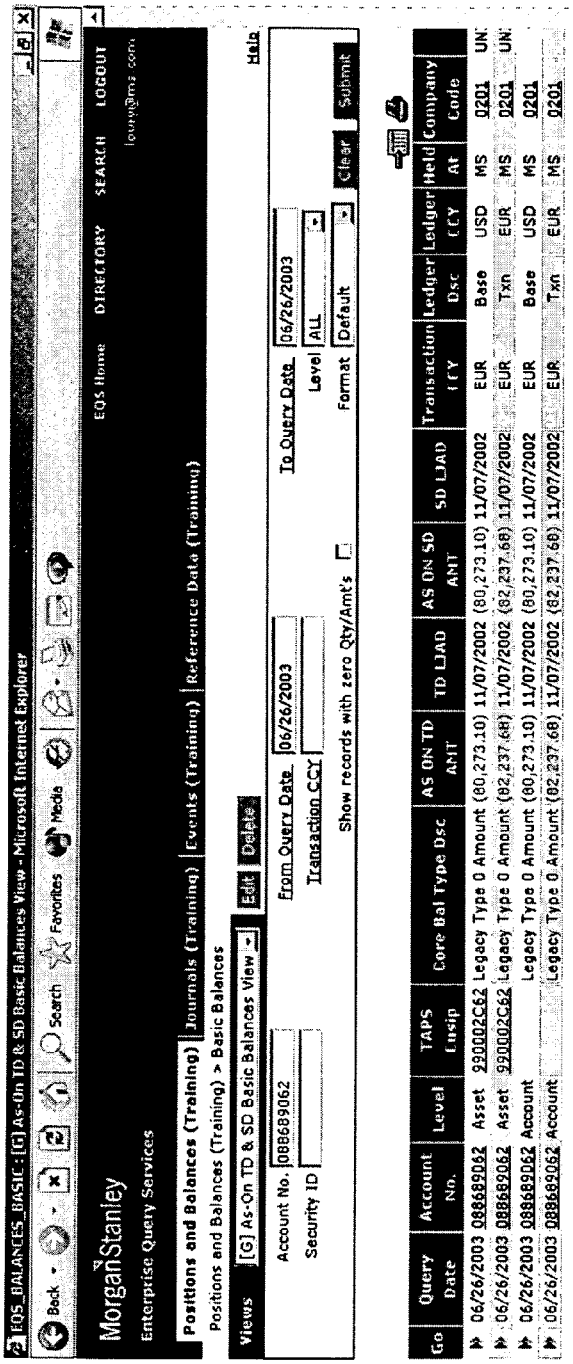

FIG. 7C illustrates one embodiment of a GUI that may be presented for performing a balance query with an account number.

Figure 7D:
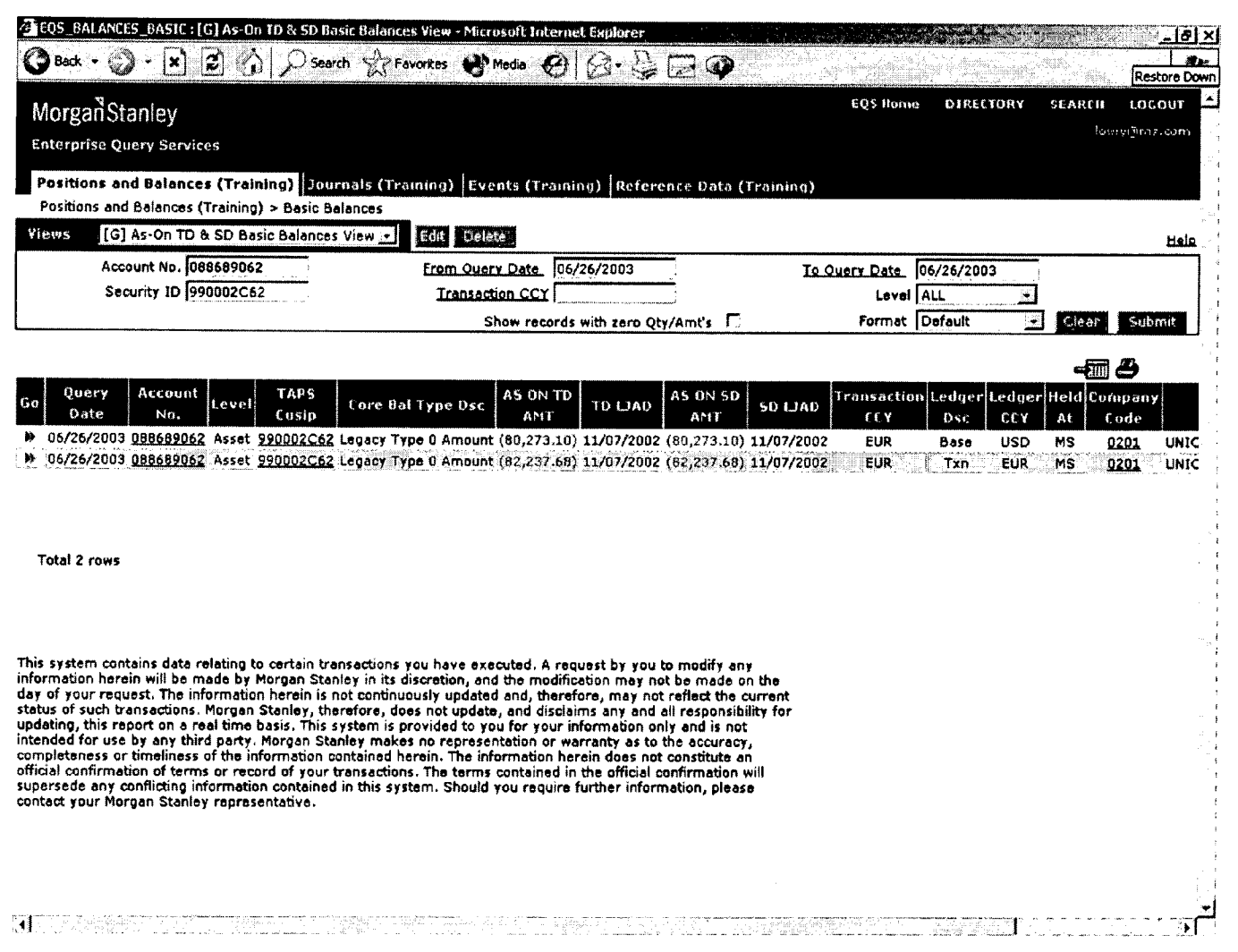

FIG. 7D illustrates one embodiment of a GUI that may be presented for performing a balance query using account number and security.

A number of implementations have been described. Nevertheless, it will be understood that various modifications may be made and that other implementations are within the scope of the following claims.

What is claimed is:

1. A computer-implemented method for operating on data representing an account, the method comprising:
   determining, by a computer system, a balance value corresponding to net sum of activity for an activity date that is set for an activity having an accounting impact using accounting impact date corresponding to latest accounting impact date among all journals affecting the balance value and a journal activity date corresponding to latest processing among all journals affecting the balance value;
   determining, by the computer system, an as-on value for the account for a given date, wherein the as-on value is an indicator of the balance for the account for the given date without taking into account adjustment values on subsequent processing dates and compensating values from prior processing dates, wherein determining the as-on value comprises summing balance values for all dates up to and including the given date using a computer system;
   determining, by the computer system, an as-of value for the account for the given date, wherein the as-of value is an indicator of the balance for the account for the given date taking into account adjustment values on subsequent processing dates and compensating values from prior processing dates, wherein determining the as-of value comprises summing balance values, adjustment values corresponding to sum of activity for the activity date to be applied on subsequent processing dates, and compensating values for all dates up to and including the given date corresponding to negative sum of activity for prior processing dates applied on the activity date using a computer system; and
   posting, in a database connected to the computer system via a network, an activity record representing account activity, wherein the activity record includes the activity date, the balance value, the accounting impact date, and the journal activity date.

2. The method of claim 1, further comprising setting an adjustment accounting impact date corresponding to latest accounting impact date among all journals affecting the adjustment value.

3. The method of claim 1, wherein the activity record is posted to a specific period.

4. The method of claim 1, further comprising obtaining latest journal accounting impact date.

5. The method of claim 1, further comprising obtaining latest journal activity date.

6. The method of claim 1, wherein the as-on value is obtained for a specific period.

7. The method of claim 1, wherein the as-of value is obtained for a specific period.

8. The method of claim 1, further comprising obtaining total adjustments for the account for a given date by summing adjustment values for all dates up to and including the given date.

9. The method of claim 1, further comprising obtaining net adjustments for the account for a given date by summing adjustment values and compensating values for all dates up to and including the given date.

10. The method of claim 1, further comprising archiving activity records according to a retention schedule.

11. The method of claim 10, wherein archiving comprises creating one or more gap records for assuming values from one or more activity records.

12. The method of claim 11, wherein archiving comprises merging one or more consecutive gap records.

13. The method of claim 11, wherein archiving comprises creating a new activity record having an activity date equal to the earliest date in the retention schedule that follows a date of the gap record.

14. The method of claim 13, wherein the new activity record comprises a balance value of zero.

15. The method of claim 10, wherein the retention schedule comprises one or more of a required number of days for maintaining activity records, a required number of months for maintaining activity records, and a required number of years for maintaining activity records.

16. The method of claim 1, wherein the database comprises a position/balance database configured to maintain point-in-time tables for recording adjustments to positions and/or balances.

17. The method of claim 16, wherein data regarding all journals is stored in a journal database.

* * * * *